United States Patent [19]

Matsuzaki et al.

[11] Patent Number: 5,202,967
[45] Date of Patent: Apr. 13, 1993

[54] DATA PROCESSING APPARATUS FOR PERFORMING PARALLEL DECODING AND PARALLEL EXECUTION OF A VARIABLE WORD LENGTH INSTRUCTION

[75] Inventors: Toshimichi Matsuzaki, Minoo; Takashi Sakao, Ibaraki, both of Japan

[73] Assignee: Matsushita Electric Industrial Co., Ltd., Osaka, Japan

[21] Appl. No.: 916,804

[22] Filed: Jul. 20, 1992

Related U.S. Application Data

[63] Continuation of Ser. No. 389,692, Aug. 4, 1989, abandoned.

[30] Foreign Application Priority Data

Aug. 9, 1988 [JP] Japan .................. 63-198226
Feb. 7, 1989 [JP] Japan .................. 1-28184

[51] Int. Cl.$^5$ .................................. G06F 9/30
[52] U.S. Cl. .................... 395/375; 364/260; 364/261.3; 364/262.9; 364/938; 364/931.41; 364/948.3; 364/946.9; 364/DIG. 1; 395/550; 395/800
[58] Field of Search .......... 395/375, 550, 800

[56] References Cited

U.S. PATENT DOCUMENTS

| | | | |
|---|---|---|---|
| 4,295,193 | 10/1981 | Pomerene | 364/200 |
| 4,476,525 | 10/1984 | Ishii | 364/200 |
| 4,752,873 | 6/1988 | Shonai et al. | 364/200 |
| 4,837,678 | 6/1989 | Culler et al. | 364/200 |
| 4,847,755 | 7/1989 | Morrison et al. | 364/200 |

FOREIGN PATENT DOCUMENTS

| | | |
|---|---|---|
| 0118830 | 9/1984 | European Pat. Off. |
| 0239081 | 9/1987 | European Pat. Off. |
| 0260409 | 3/1988 | European Pat. Off. |

OTHER PUBLICATIONS

Miller et al., "Floating-Duplex Decode and Execution of Instruction", IBM Technical Disclosure Bulletin, vol. 23, No. 1, pp. 409–412, Jun. 1980.

*Primary Examiner*—Thomas C. Lee
*Assistant Examiner*—Ken S. Kim
*Attorney, Agent, or Firm*—Stevens, Davis, Miller & Mosher

[57] ABSTRACT

A data processing apparatus for decoding and executing instructions in a parallel manner in a variable word length instruction format. A plurality of decoders is used in which while the primary instruction decoder is decoding an instruction, the probability of parallel decoding of the next instruction is detected, so that the primary instruction decoder and a secondary instruction decoder decode a variable word length instruction and a fixed word length instruction, respectively, in a parallel manner. A conditional branch instruction of a fixed word length and the subsequent instruction of a variable word length are decoded and executed in a parallel manner to increase the speed at which the conditional branch instruction is executed.

3 Claims, 10 Drawing Sheets

ORDER OF INSTRUCTION EXECUTION

FIG. 2B

DECODING OF A0 INSTRUCTION

FIG. 2C

PARALLEL DECODING OF A1 AND A2 INSTRUCTIONS

CONDITIONS ARE MET:

FIG. 4B

CONDITIONS ARE NOT MET:

FIG. 12A
1) CONDITIONAL BRANCH INSTRUCTION

FIG. 12B
2) LOAD INSTRUCTION

FIG. 12C
3) STORE INSTRUCTION

FIG. 13

DATA PROCESSING APPARATUS FOR PERFORMING PARALLEL DECODING AND PARALLEL EXECUTION OF A VARIABLE WORD LENGTH INSTRUCTION

This application is a continuation of application Ser. No. 07/389,692, filed Aug. 4, 1989, now abandoned.

BACKGROUND OF THE INVENTION

The present invention relates to apparatus for decoding a plurality of instructions simultaneously and executing the decoded plurality of instructions simultaneously in a variable word length instruction format.

A parallel processing operation is generally performed in a conventional data processing apparatus in order to increase the rate of data processing. For example, in processing two instructions in a parallel manner, two decoders are provided to decode two instructions simultaneously and to operate two execution units simultaneously. In Japanese Patent Publication JP-A-63-49843, a first and a second decoder decodes two (arithmetic and logical operation) instructions, respectively, to operate an arithmetic operation unit and a logical operation unit simultaneously to improve the system performance. In this example, the instructions are decoded in a parallel manner in the fixed word length instruction format, so that it is easy to realize such decoding.

In a variable word length instruction format in which the length of the instruction code changes depending on the kind of operations and the addressing mode, the position of an instruction subsequent to the instruction which is being decoded is determined by the result of the decoding of the present instruction, so that it is difficult to decode a plurality of instructions simultaneously. In order to cope with this situation, a plurality of second decodes which decode simultaneously instruction words subsequent to the instructions which are being decoded are provided, or a selector which selects an instruction word input to the second instruction decoder is provided and controlled in accordance with the result of the decoding by the first instruction decoder to determine the input to the second instruction decoder. Therefore, the number of decoders would increase and the time required for decoding would increase undesirably.

There is a data processing apparatus in which since it is difficult to decode a plurality of instructions simultaneously in a variable word length instruction format the results of decoding the respective instructions are beforehand stored, such results for two instructions are given simultaneously to an execution unit to simultaneously execute the two instructions in a parallel manner. ("Study of CPU Architecture of 32-Bit Microprocessor TX3 Based on TRON Specifications", TECHNICAL REPORT OF COMPUTER SYSTEMS, Institute of Electronics, Information and Communication Engineers (IEICE), Vol. 87, No. 422, 1988.)

According to the data processing apparatus of this apparatus, a predetermined quantity of the results of decoding instructions is stored in a decoded-instruction buffer, and the results of the decoding are supplied to a plurality of execution units so long as the decoded results in the decoded-instruction buffer can be used repeatedly via a program loop. In order to store the decoded results and improve the effect of reuse of the decoded result, a decoded instruction buffer of a large capacity is required. For the first use of the loop, namely, until storage of the decoded result in the decoded-instruction buffer is completed, the transmission ability of the decoded instruction buffer is limited to the throughput of one-instruction decoding.

SUMMARY OF THE INVENTION

It is an object of the present invention to provide a data processing apparatus which decodes a plurality of instructions in a parallel manner in a variable word length instruction format without increasing a quantity of decoding hardware greatly.

In order to achieve the above object, the present invention provides a data processing apparatus comprising:

a first instruction decoder for decoding a variable word length instruction;

parallel decoding probability detection means for decoding the instruction word subsequent to the instruction decoded by the first instruction decoder and for beforehand detecting the presence of instructions decodable in a parallel manner;

at least one second instruction decoder for decoding the instruction detected by the parallel decoding probability detection means; and instruction supplying means for selectively validating the instruction detected by the parallel decoding probability detection means in accordance with a signal indicative of the boundary of the instruction outputted by the first instruction decoder, supplying the validating instruction to the second instruction decoder and the instruction subsequent to the former instruction to the first instruction decoder.

DESCRIPTION OF THE PREFERRED EMBODIMENTS

Figure 1:
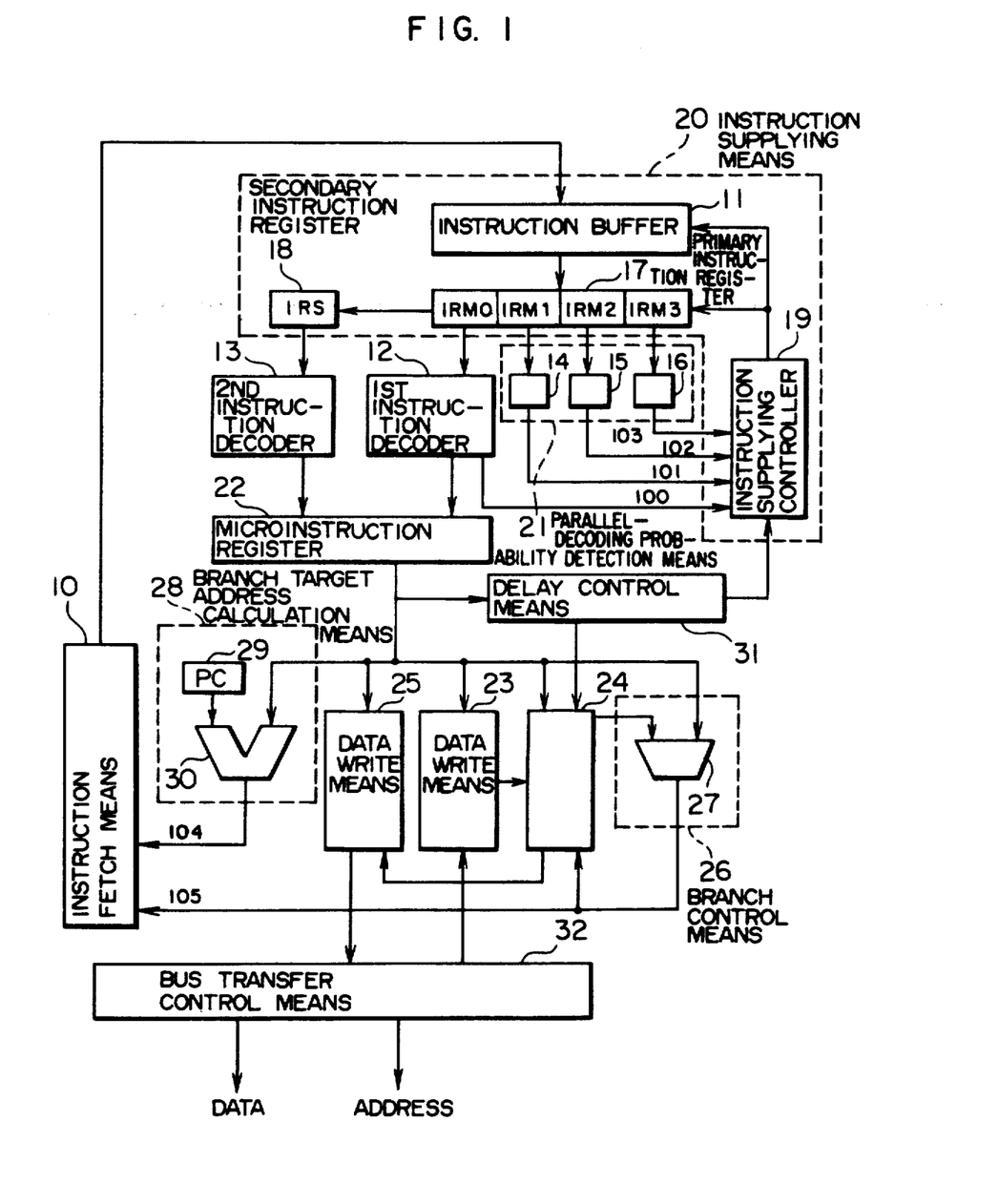
FIG. 1 is a schematic of a data processing apparatus as one embodiment of the present invention.

FIG. 1 is a block diagram of a data processing apparatus as one embodiment of the present invention. In FIG. 1, an instruction fetch control unit 10 fetches an instruction before execution. An instruction buffer 11 stores instructions prepared by the fetch control unit 10 and supplies necessary instructions to a decoder. A first instruction decoder 12 decodes a variable word length instruction and decodes all instructions except for a plurality of instructions (at least one fixed word length instruction included in a variable word length instruction format) decoded in a parallel manner. A second instruction decoder 13 decodes only instructions to be decoded in a parallel manner. Parallel decoding probability detectors 14, 15, 16 detect the presence of a combination of instructions to be decodable in a parallel manner (at least one fixed word length instruction included in a variable word length instruction format and subsequent instructions) in a line of instructions subsequent to the one decoded by the first instruction decoder 12. Reference numerals 101, 102, 103 denote the results of detection by the corresponding parallel decoding probability detectors. A primary instruction register 17 holds an instruction word which the first instruction decoder 12 decodes and subsequent instructions. A secondary instruction register 18 holds the instruction which the second instruction decoder 13 decodes. An instruction supplying controller 19 controls the shift of the contents in the primary and secondary instruction registers 17 and 18, validates one of the results of detection by the parallel decoding probability detectors 101, 102 and 103 depending upon the output from the primary instruction decoder 12 which indicates the boundary of the instruction decoded by primary instruction decoder 12, and stores in the secondary instruction register 18 instruction portions other than an immediate and a displacement included in the instruction. An instruction supplying means 20 supplies instructions to the instruction decoders 12, 13 and parallel decoding probability detection means 21. A buffer (or microinstruction register) 22 temporarily holds the result of the decoding by the instruction decoders 12 and 13. Data read means 23 calculates the address of data stored in memory and reads data from an external memory via a bus transfer control means 32. An execution unit 24 performs operations on a plurality of data segments stored in the register and stores the data in the memory read by the data read means 23 in an internal register. Data write means 25 stores in the memory the data calculated by the execution means 24. Branch control means 26 receives the condition code of a conditional branch instruction stored in a microinstruction register 22 and an operation result flag output by the execution means 24, and detects the presence of the branch conditions in a comparator 27. The branch control means 26 suppresses the execution of the instruction subsequent to the branch instruction in the execution means 24 in accordance with a branch effecting signal 105 when the branch conditions are satisfied, and simultaneously controls the instruction fetch means 10 such that a new instruction issues from the branching target address 104. Branch target address calculating means 28 includes an adder 30 for address calculation only and a program counter (PC) which holds the address of an instruction executed at present, and calculates irrespective of the execution means 24 the branch target address 104 of the conditional branch instruction or non-conditional branch instruction in accordance with an instruction of the microinstruction register 22. When the instruction subsequent to a load instruction uses in the execution means 24 the data which the data read means 23 has read from the memory in accordance with the load instruction, delay control means 31 delays the operation of the subsequent instruction until the reading of the load instruction has been completed. A bus transfer control means 32 controls the data transfer between the inside and outside of the processor.

Figure 12A:
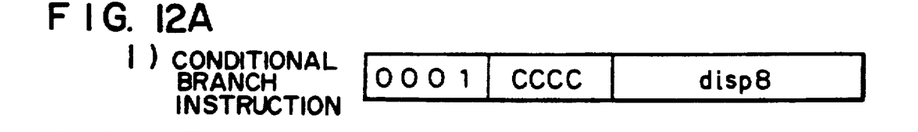
FIGS. 12A, 12B and 12C together illustrate a bit pattern of an instruction to perform parallel decoding in the embodiment of the present invention respectively.
Figure 12B:
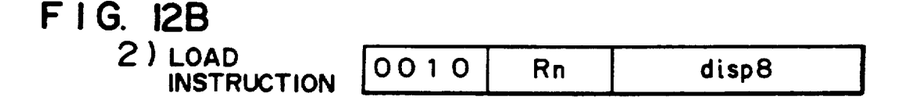
Figure 12C:
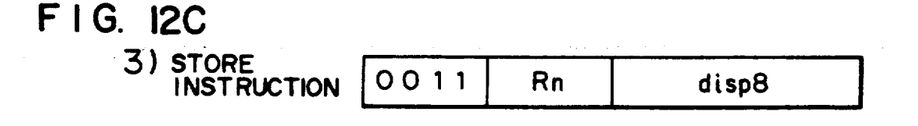

FIGS. 12A, 12B and 12C illustrate examples of a bit pattern of instructions which are decoded in a parallel manner in the particular embodiment of the present invention respectively. Reference characters CCCC denotes the condition of a conditional branch instruction; disp 8, an offset of the branch target address present when the conditions are met or the base offset values of the load and store instructions; and Rn, the base register number.

Figure 13:
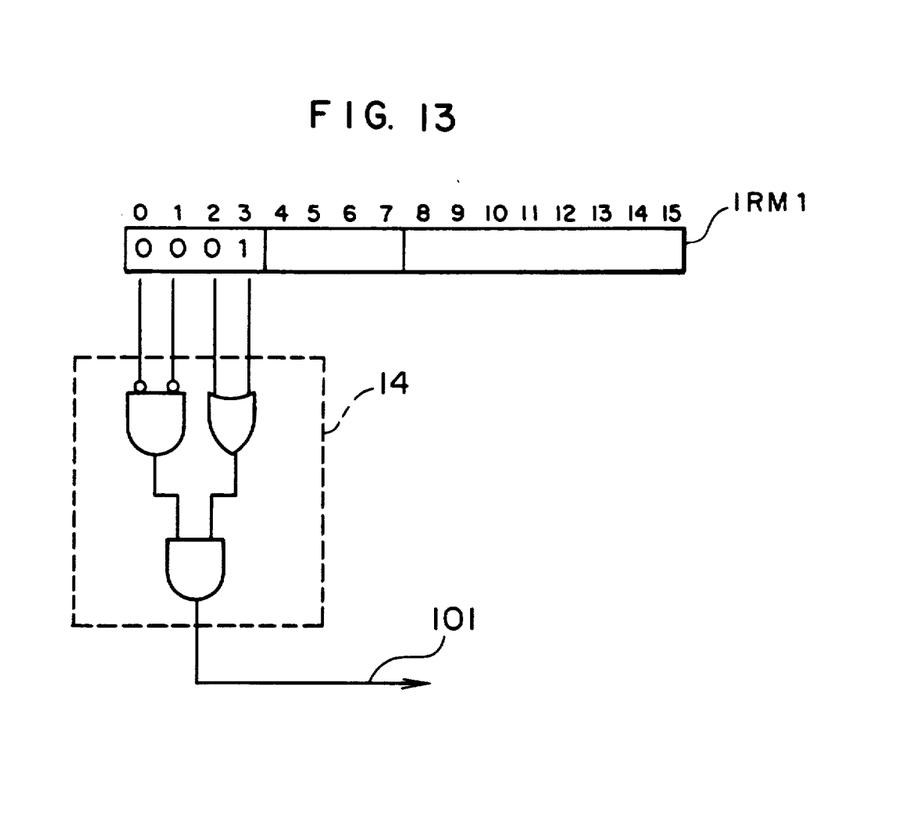
FIG. 13 is a schematic of a parallel decoding probability detector in the embodiment of the present invention.

FIG. 13 illustrates the structure of the parallel decoding probability detector in the particular embodiment of the present invention. The parallel decoding probability detector detects whether there is the bit pattern of the instruction of FIGS. 12A, 12B and 12C in the line of instructions stored in the primary instruction register, and is realized by a simple structure such as that shown.

Figure 2A:
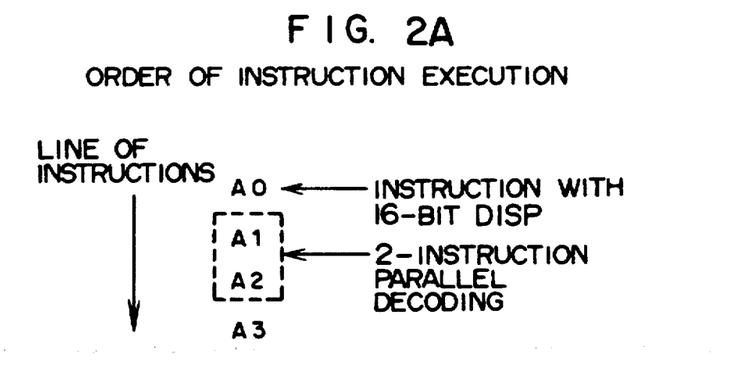
FIGS. 2A, 2B and 2C together illustrate the parallel decoding of two instructions in a variable word length instruction using a data processing apparatus according to the present invention.
Figure 2B:
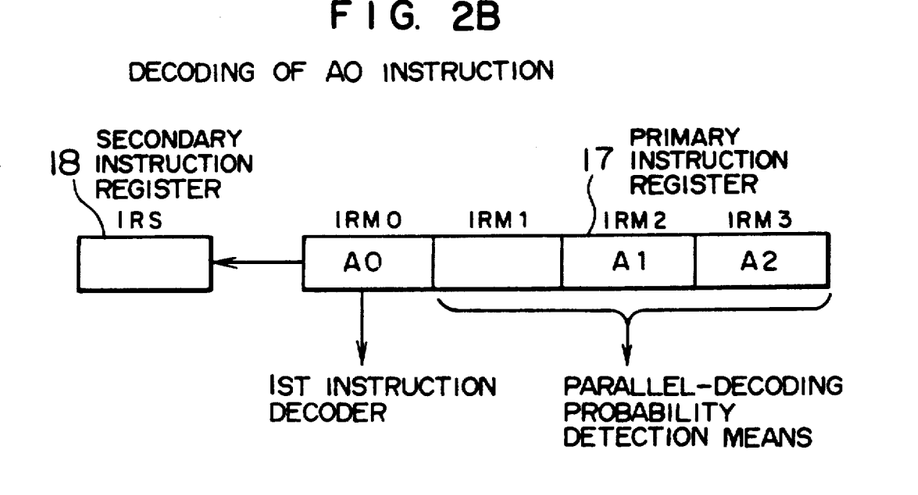
Figure 2C:
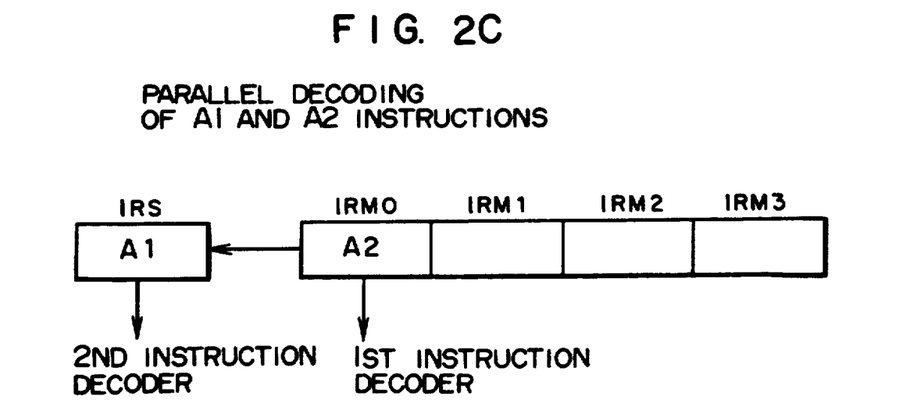

FIG. 2 illustrates the parallel decoding of two variable word length instructions using the data processor according to the present invention. The parallel instruction decoding of a variable word length instruction in the particular embodiment will be described with respect to FIGS. 1, 2A, 2B and 2C.

FIG. 2A shows the order of instructions to be executed, starting with an A0 instruction. The A0 instruction has a 16-bit displacement, and it is assumed that A1 and A2 instructions are decoded in a parallel manner.

FIG. 2B illustrates the state of the primary and secondary instruction registers 17 and 18 with the first instruction decoder 12 decoding the A0 instruction in the primary instruction register. Four 16-bit instruction registers IRM0–IRM3 constituting the primary instruction register 17 store the A0 instruction, the displacement of A0 instruction, A1 instruction and A2 instruction, respectively. At this time, the first instruction decoder 12 decodes the A0 instruction in the IRM0, and outputs a signal 100 indicating that the instruction boundary of the A0 instruction is between the IRM1 and IRM2. Simultaneously, the parallel decoding probability detectors 14-16 each detect whether there is any probability of two of the displacement, and A1 and A2 instructions being decoded in a parallel manner and outputs the result of the detection on the probabilities to signal lines 101-103. At this time, the parallel decoding probability detector 14 does not recognize the boundary of the instruction, so that if the displacement in the IRM1 happens to coincide with one of the instruction codes to be decoded in a parallel manner, the detector 14 outputs a wrong result of detecting the parallel decoding probability to the signal line 101. The instruction supplying controller 19 eliminates the wrong results of the detection from the signal lines 101-103 in accordance with the signal 100 indicative of the boundary of the instruction, and determines that the result of the detection 102 is a true one. It controls the shift of all the instructions stored in the primary and secondary instruction registers 17 and 18 in accordance with the determination to store the A1 instruction in IRM2 in the secondary instruction register 18 and the A2 instruction in the subsequent IRM3 in the instruction register IRM0, respectively. FIG. 2C illustrates that situation in which the first instruction decoder 12 decodes the A2 instruction and the second instruction decoder 13 decodes the A1 instruction, namely parallel 2-instruction decoding. The parallel decoding probability detection means only detects the presence of instructions to be decoded in a parallel manner (at least one fixed word length instruction included in a variable word length instruction format; in the embodiment, the conditional branch instruction, the load instruction and the store instruction) and may be realized by hardware comprising several gates (decoders). The second instruction decoder 13 is required to decode the instructions to be decoded in a parallel manner and the first instruction decoder 12 is required to decode an instruction other than the instructions to be decoded in a parallel manner, so that there are no duplicate decoders and the total quantity of decoding hardware does not increase.

Figure 3:
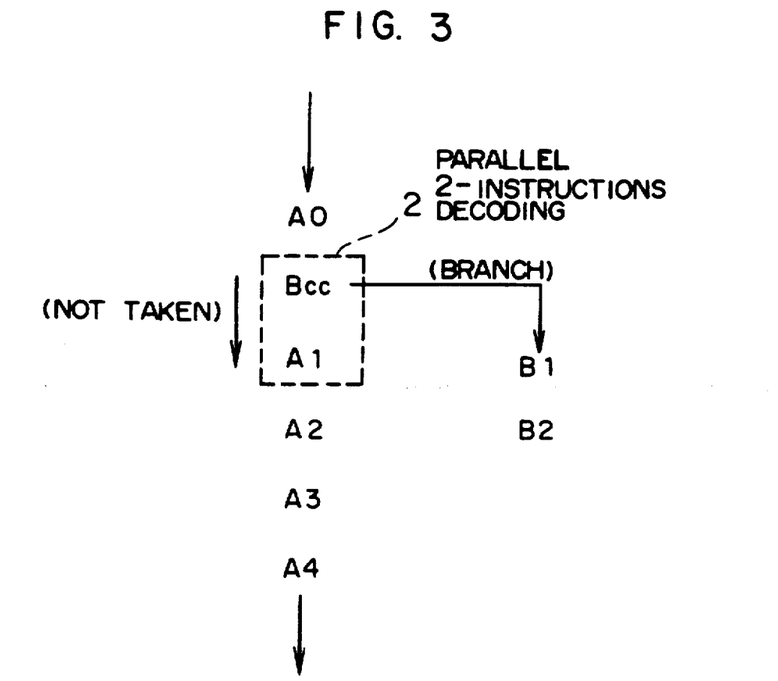
FIG. 3 illustrates a line of executed instructions for explaining the operation of the apparatus in which a high-speed conditional branch instruction is used.
Figure 4A:
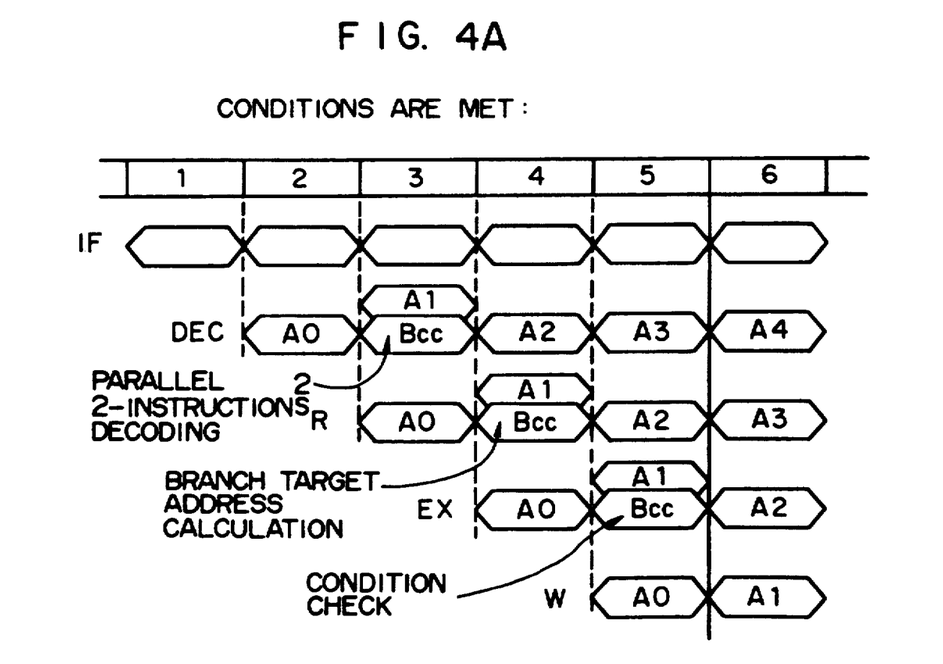
FIGS. 4A and 4B together are contrasting timing charts for explaining the operation of the apparatus in which a high-speed conditional branch instruction is used.
Figure 4B:
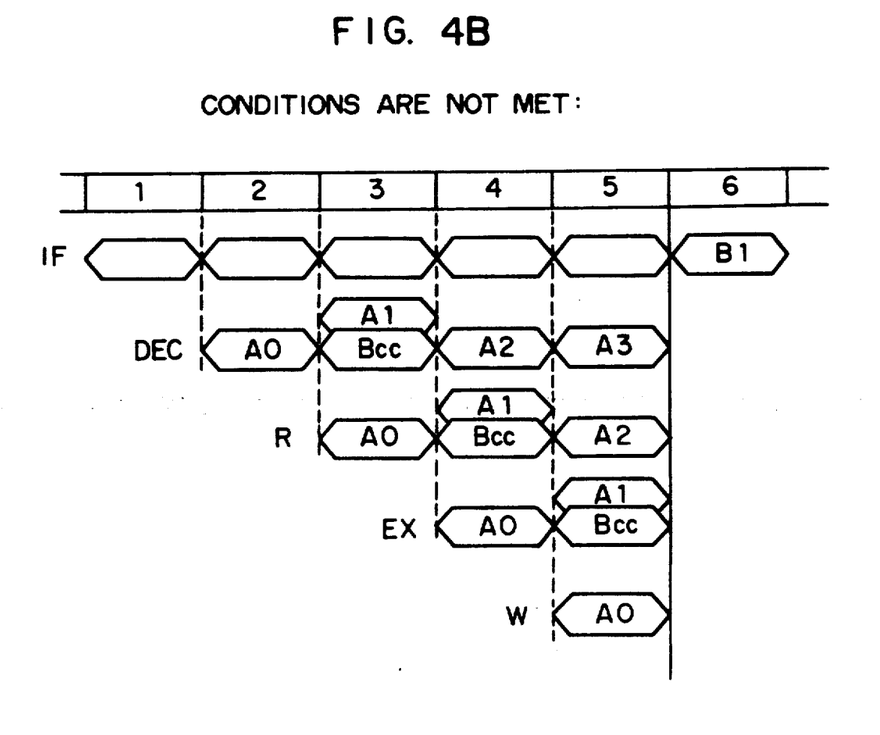

FIGS. 3, 4A and 4B illustrate an increase in the rate of execution of a conditional branch instruction by decoding and executing a conditional instruction and the subsequent instruction in a parallel manner when the conditional instruction is not taken.

FIG. 3 illustrates a line of instructions to be executed, branching to a B1 instruction when the conditions of a conditional branch instruction (Bcc) are met and execution of the subsequent A1 instruction when the conditions are not met. By the above parallel instruction decoding method, the conditional branch instruction and the subsequent A1 instruction are decoded in a parallel manner. In FIGS. 4A and 4B, reference character IF denotes the operation of the instruction pre-fetch means 10; DEC, the operation of the instruction decoder; R, the reading operation of the internal register; EX, the operation of the execution means 24; and W, the writing operation into the internal register. The A0 instruction is decoded at timing 2, the contents in the internal register are read at timing 3, execution is effected at timing 4 and the result of the execution is written into the internal register at timing 5 at which an A0 instruction calculation result flag is also outputted to the comparator 27 of the branch control means 26. At timing 3, the conditional branch instruction and the subsequent A1 instruction are decoded in a parallel manner, and the result of the decoding is stored in the microinstruction register 22. At timing 4, the address of the B1 instruction is calculated in the address calculation-only adder 30 of the branch address calculation means 28 in accordance with the instruction in the microinstruction register 22 and temporarily stored until a new need arises. While the branch target address is usually obtained by adding an offset value such as a displacement, shown by the conditional branch instruction, to the count of the program counter 29, it may be obtained by adding the contents of the internal register instead. The contents of the internal register necessary for the calculation of the A1 command are read out in the execution means 24. At timing 5, the A1 instruction is calculated in the execution means 24 and the result of the execution is temporarily stored. Simultaneously, the comparator 27 of the branch control means 26 compares the condition code of the conditional branch instruction and the calculation result flag of the A0 instruction calculated at the timing 4. If the conditions are not met as the result of the comparison, the branch control means 26 writes the results of calculation of the A1 instruction stored at timing 5 into the internal register at timing 6, nullifies the address of the B1 instruction calculated at timing 4, and causes the instruction prefetch means 10 to continue to fetch the line of instructions subsequent to the conditional branch instruction (FIG. 4A, when the conditions are not met). If the conditions are known to be met as the result of the comparison, the branch control means 26 inhibits the writing of the result of calculation of the A1 instruction and nuffilies the execution of all the subsequent instructions at timing 6. It further causes the instruction prefetch means 10 to fetch the B1 instruction in accordance with the address of the B1 instruction calculated at timing 4 to perform the processing starting with the B1 instruction (FIG. 4B, when the conditions are met).

Figure 5:
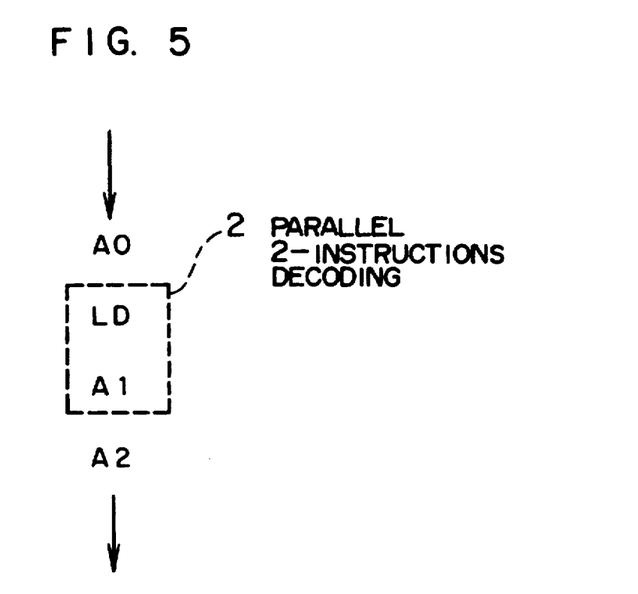
FIG. 5 illustrates a line of executed instructions for explaining the operation of the apparatus in which a high-speed load instruction is used.
Figure 6:
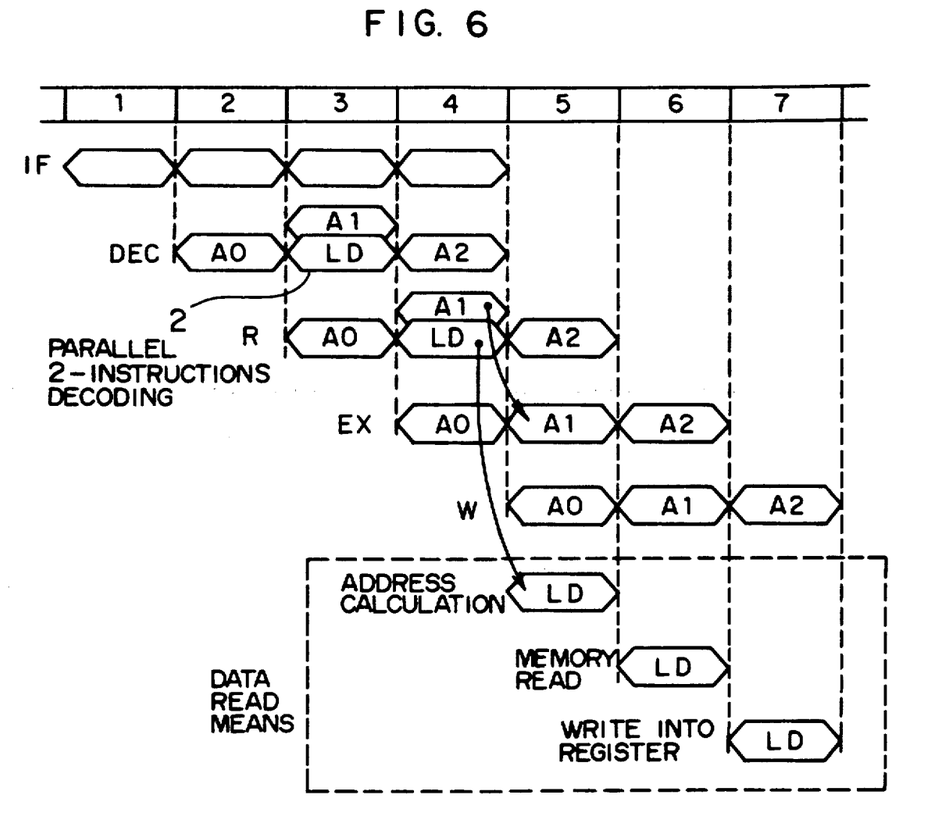
FIG. 6 is a timing chart for explaining the operation of the apparatus in which a high-speed load instruction is used.

The timing of a pipeline operation will be described which is performed when the load instruction and register-to-register calculation instruction are decoded and executed in a parallel manner while the store instruction and register-to-register calculation instruction are simultaneously decoded and executed in a parallel manner. FIG. 5 illustrates a line of instructions comprising A0 instruction, LD instruction, A1 instruction, and A2 instruction executed in this order. The A1 instruction is the register-to-register calculating instruction. The LD instruction and the subsequent A1 instruction are decoded in a parallel manner. FIG. 6 illustrates the timing of the pipeline operation performed when the load instruction and register-to-register calculating instruction are decoded and executed in a parallel manner. The pipeline processing of the register-to-register calculating instruction consists of instruction fetch, instruction decoding, register reading, calculation and register writing. The pipeline processing of the load instruction consists of instruction fetch, instruction decoding register reading, address calculation, memory reading and register writing. In the register reading, the reading of the internal register is performed which is necessary for calculation of the address of data to be loaded.

The A0 instruction is decoded at timing 2 similar to that in FIGS. 4A and 4B, the contents of the internal register are read which are necessary for the calculation at timing 3, calculation is performed at timing 4, and the result of the calculation is written into the internal register at timing 5. The LD instruction and A1 instruction are decoded in a parallel manner at timing 3. At timing 4, the contents of the register necessary for the calculation of the memory address of the LD instruction, the contents of the source register necessary for register calculation of the A1 instruction, and the contents of the destination register are read. The execution means 24 performs the register-to-register calculation of the A1 instruction at timing 5 and writes the result of the calculation into the internal register at timing 6. The data read means 23 calculates at timing 5 the address of the data to be loaded and reads the memory via the bus transfer control means 32 at timing 6. It writes the read data into the internal register at timing 7. The load instructions are decoded in a parallel manner in this way, and the register-to-register calculating instruction immediately subsequent to the load instruction are processed by the data read means 23 and execution means 24, respectively, in a parallel manner.

Figure 7:
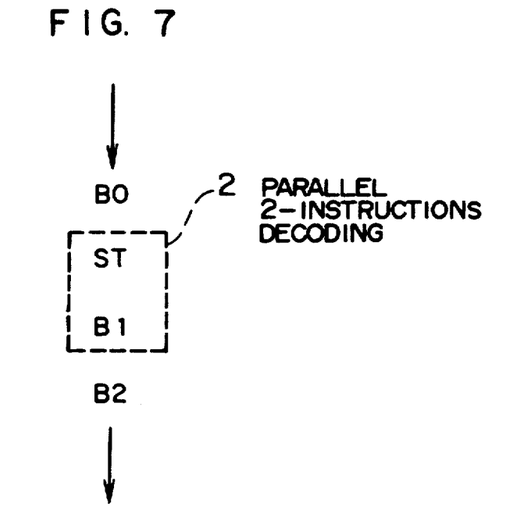
FIG. 7 illustrates a line of executed instructions for explaining the operation of the apparatus in which a high-speed store instruction is used.
Figure 8:
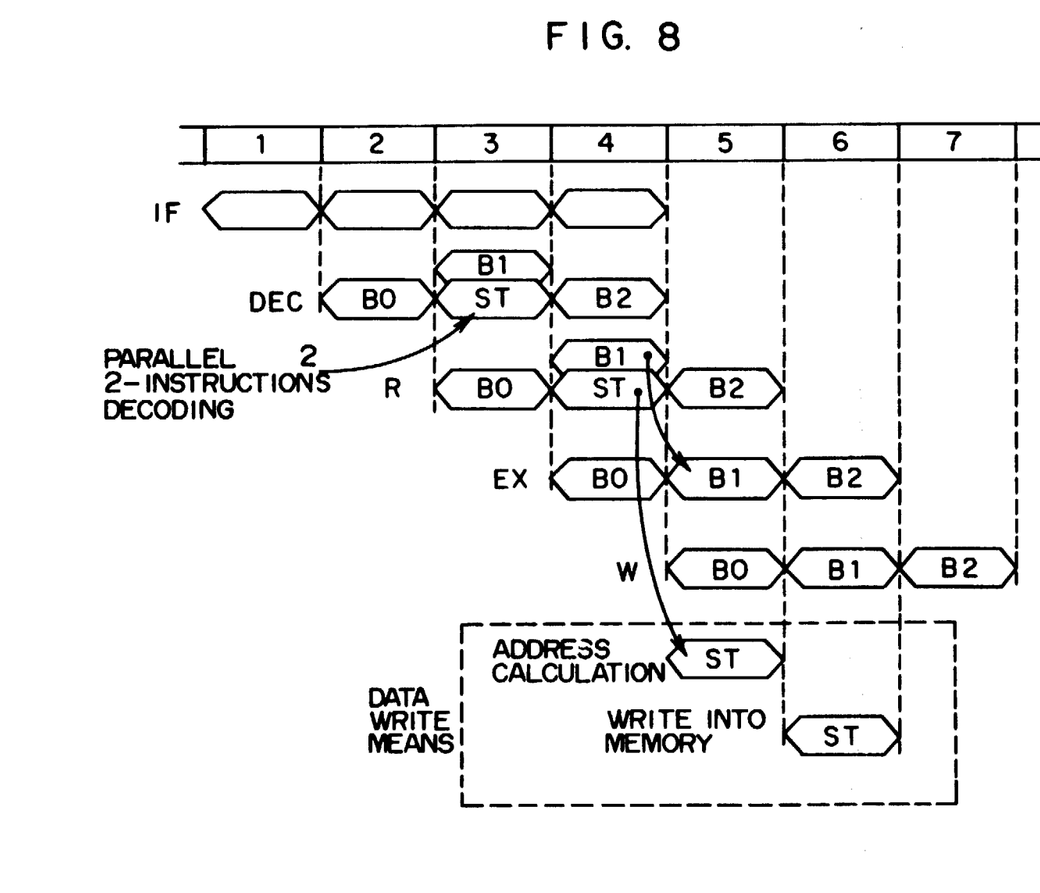
FIG. 8 is a timing chart for explaining the operation of the apparatus in which a high-speed store instruction is used.

FIG. 7 illustrates a line of B0 instruction, ST instruction, B1 instruction, and B2 instruction executed in this order. The B1 instruction is the register-to-register calculating instruction, and the ST instruction and the subsequent B1 instruction are decoded in a parallel manner. FIG. 8 illustrates the pipeline operation timing at which the store instruction and the subsequent register-to-register calculating instruction are decoded in a parallel manner.

The pipeline processing of the store (ST) instruction consists of instruction fetch, instruction decoding, register reading, address calculation and memory writing. The B0 instruction is decoded at timing 2 as in FIGS. 4A and 4B, the contents of the internal register necessary for the calculation are read at timing 3, and calculated at timing 4, and the result of the calculation is written into the internal register at timing 5. The ST and B1 instructions are decoded in a parallel manner at timing 3. At timing 4, the contents of the register necessary for the memory address calculation of the ST instruction and the contents of the source register and destination register necessary for the register-to-register calculation of the B1 instruction are respectively read out. The execution means 24 performs the register-to-register calculation for the B1 instruction at timing 5, and writes the result of the calculation into the internal register at timing 6. The data write means 25 calculates at timing 5 the address of the data to be stored and writes the result into the memory via the bus transfer control means 32 at timing 6. The store instruction and the subsequent register-to-register calculating instruction which are thus decoded in a parallel manner are processed in a parallel manner by the data write means 25 and execution means 24, respectively.

Figure 9:
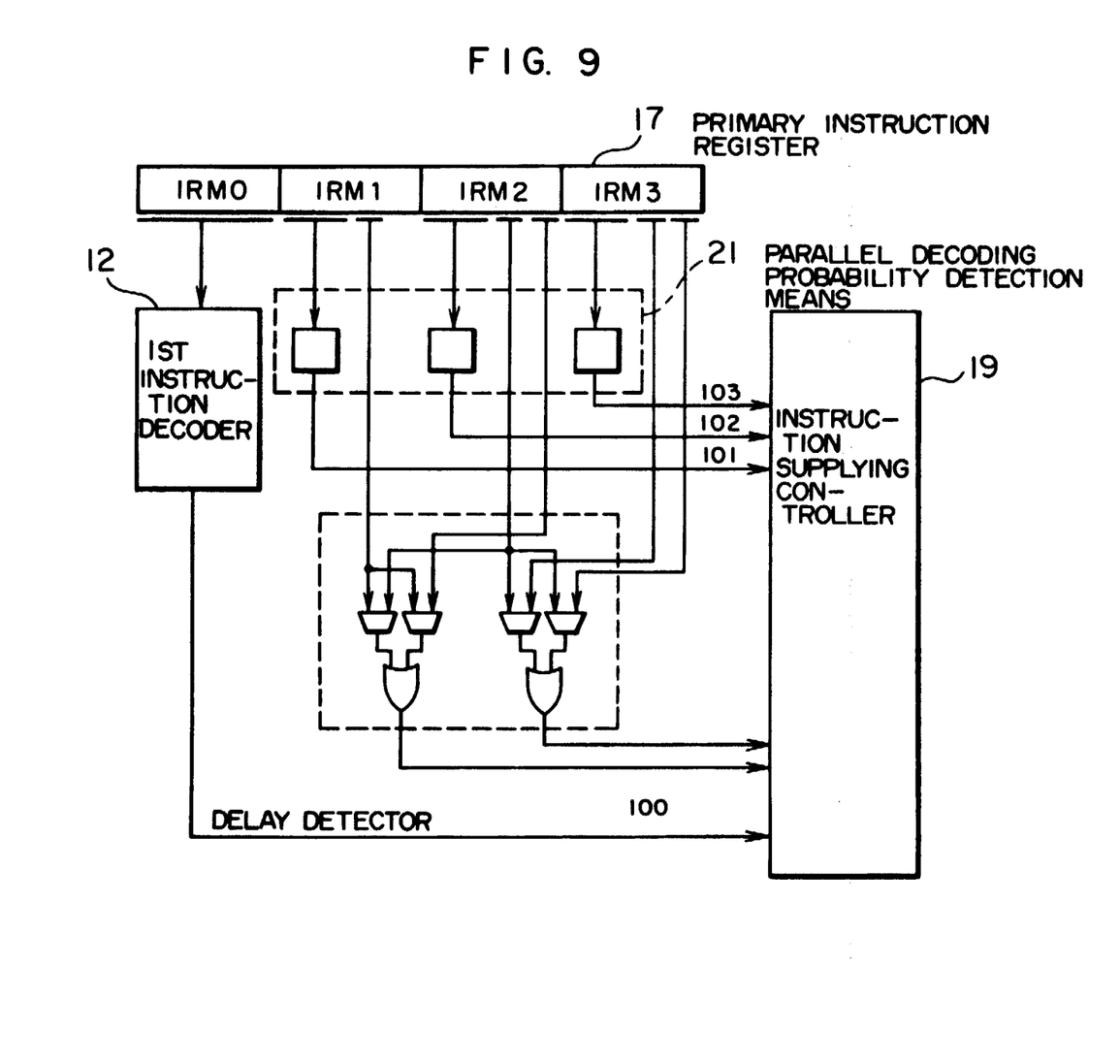
FIG. 9 is a schematic of an operation delay control unit.
Figure 10:
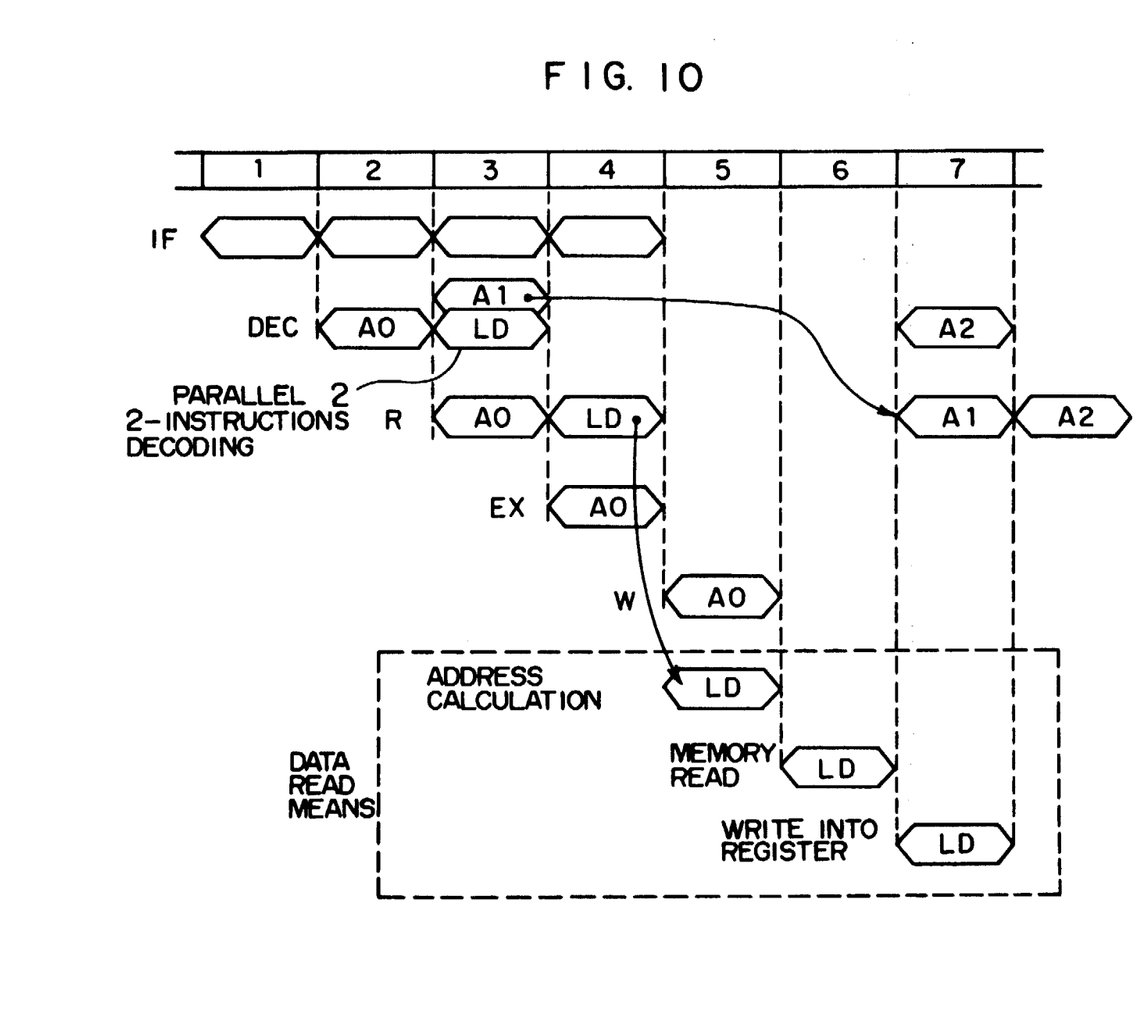
FIG. 10 is a timing chart for illustrating the pipeline operation of a load instruction when a register conflict has occurred and an register-to-register calculating instruction subsequent to the load instruction.

FIG. 6 illustrates the operation performed when no internal register resources conflict. For example, when the data read out of the memory by the LD instruction is used by the subsequent A1 instruction, the conflict of data occurs, so that it is necessary to delay the execution of the A1 instructions decoded in a parallel manner until the data in the memory is read out. FIG. 9 illustrates the structure of the delay control means 31. The delay detector checks the register field of the instruction codes stored in the instruction registers IRM1–IRM3 in parallel with the operation of the parallel decoding probability detection means 21 and reports to the instruction supplying controller 19 on whether the destination register for the load instruction is designated as the source for the subsequent instructions. The instruction supplying controller 19 which has received the report selects a true one from a plurality of reports in accordance with the boundary signal 100 of the instruction outputted by the first instruction decoder 12 as from the parallel decoding probability results 101–103, and stops supplying the next instruction until the execution of the load instruction is terminated. FIG. 10 shows the pipeline operation timing used at this time. The operations performed by the A1 and subsequent instructions decoded in a parallel manner at timing 3 are awaited until the reading of the data on the LD instruction at timing 6 is terminated, and the reading of the internal register necessary for execution of the A1 instruction is then performed at timing 7.

Figure 11:
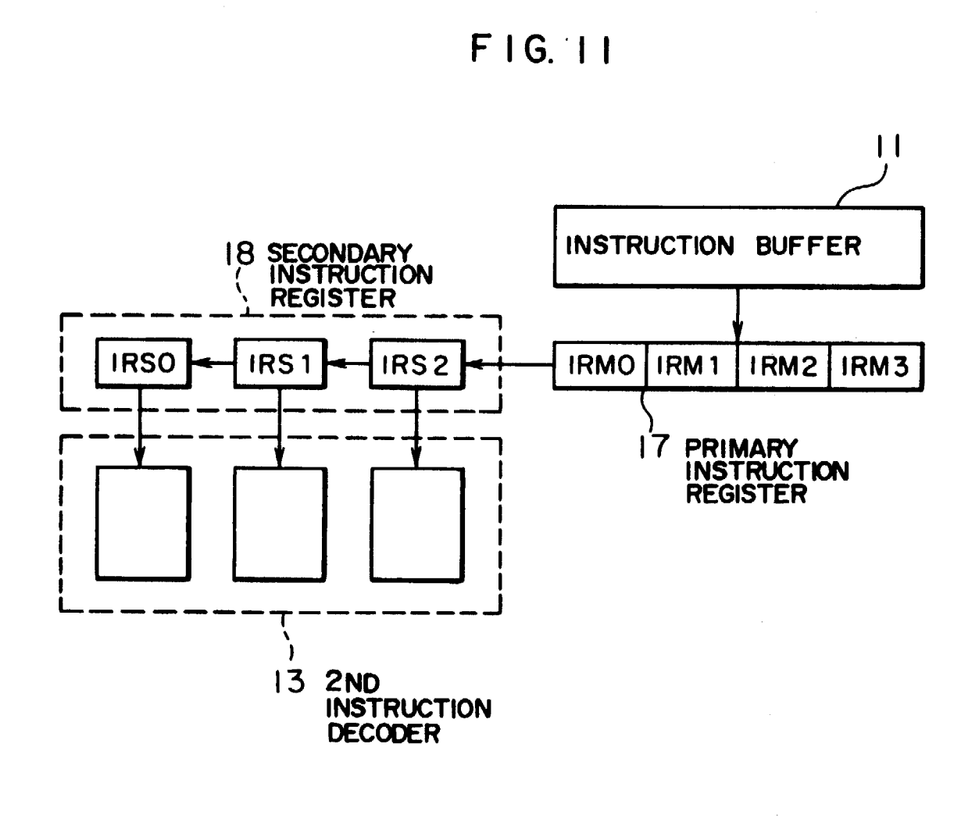
FIG. 11 illustrates a second schematic of a second instruction decoder.

While the embodiment of the present invention illustrated above is directed to the parallel decoding of two instructions, three or more instructions can be decoded in a parallel manner by providing a plurality of secondary instruction registers. FIG. 11 illustrates the structure of the secondary instruction registers used to decode four instructions in a parallel manner. Also in this case, the plurality of second instruction decoders are only required to decode instructions in a parallel manner and the total quantity of decoding hardware does not increase. In addition, since a plurality of small decoders can be used instead, high-speed access is possible when the decoders are realized by PLAs.

The embodiment of the present invention described above may produce the following effects;

(1) A plurality of instructions are decoded in a parallel manner in a variable word length instruction format with no decoders being increased in number.

(2) If the conditions of a conditional branch instruction are not met, the time required for execution of the conditional branch instruction is nullified seemingly.

(3) The time required for execution of the load instruction is nullified seemingly if the instruction subsequent to the load instruction is directed to register-to-register calculation.

(4) The time required for execution of the store instruction is nullified seemingly if the instruction subsequent to the store instruction is directed to register-to-register calculation.

While in the particular embodiment the bit pattern of FIGS. 12A, 12B and 12C are used for three instructions to be decoded in a parallel manner, the present invention is not limited to the particular embodiment and can be set as needed and decoders and parallel decoding probability detectors may be used correspondingly, of course.

What is claimed is:

1. A data processing apparatus for decoding in parallel a plurality of instructions of a variable word length instruction system including at least one fixed length instruction, comprising:

instruction supplying means for providing a first instruction having a variable word length and a second instruction subsequent to said first instruction;

a first instruction decoder means for receiving and decoding said first instruction and providing a signal indicative of a boundary of the first instruction;

parallel decoding probability detection means for receiving said second instruction while the first instruction is currently being decoded by the first instruction decoder means, for decoding said second instruction and for detecting whether the second instruction is a parallel-decodable instruction which has a fixed length and is decodable in parallel with an instruction decoded in said first instruction decoder means;

at least one second instruction decoder means for decoding the parallel-decodable instruction detected as parallel-decodable by the parallel decoding probability detection means in parallel with an instruction decoded in said first instruction decoder; and said instruction supplying means for selectively validating the parallel-decodable instruction detected by the parallel decoding probability detection means as a validated parallel-decodable instruction in accordance with the signal indicative of the boundary of the first instruction outputted by the first instruction decoder means, and for supplying the validated parallel-decodable instruction to the second instruction decoder means and an instruction subsequent to the validated parallel-decodable instruction to the first instruction decoder means.

2. A data processing apparatus for processing in parallel a conditional branch instruction and subsequent instructions including conditional branch instructions, comprising:

instruction supplying means for providing a first instruction having a variable word length and a second instruction subsequent to said first instruction;

a first instruction decoder means for receiving and decoding said first instruction and providing a signal indicative of a boundary of the first instruction;

parallel decoding probability detection means for receiving said second instruction while the first instruction is currently being decoded by the first instruction decoder means, for decoding said second instruction and for detecting whether the second instruction is a parallel-decodable instruction which has a fixed length and is decodable in parallel with an instruction decoded in said first instruction decoder means;

at least one second instruction decoder means for decoding the parallel-decodable instruction detected as parallel-decodable by the parallel decoding probability detection means in parallel with an instruction decoded in said first instruction decoder; and said instruction supplying means for selectively validating the parallel-decodable instruction detected by the parallel decoding probability detection means as a validated parallel-decodable instruction in accordance with the signal indicative of the boundary of the first instruction outputted by the first instruction decoder means, and for supplying the validated parallel-decodable instruction to the second instruction decoder and an instruction subsequent to the validated parallel-decodable instruction to the first instruction decoder means;

an adder receiving an instruction from said second instruction decoder when said parallel-decodable instruction is a conditional branch instruction and for calculating and outputting a branch target address of said conditional branch instruction;

a comparator for detecting whether conditions defined in the conditional branch instruction are met; and branch control means for suppressing an execution of instructions subsequent to the conditional branch instruction only in response to an indication by said comparator that the conditions are met and for starting an execution of the instruction from the branch target address outputted by the adder.

3. A data processing apparatus, for use with a memory unit, for processing in parallel a data transmission instruction between said memory unit and an internal register and its subsequent instructions, comprising:

instruction supplying means for providing a first instruction having a variable word length and a second instruction subsequent to said first instruction;

a first instruction decoder means for receiving and decoding said first instruction and providing a signal indicative of a boundary of the first instruction;

parallel decoding probability detection means for receiving said second instruction while the first instruction is currently being decoded by the first instruction decoder means, for decoding said second instruction and for detecting whether the second instruction is a parallel-decodable instruction which has a fixed length and is decodable in parallel with an instruction decoded in said first instruction decoder means;

at least one second instruction decoder means for decoding the parallel-decodable instruction detected as parallel-decodable by the parallel decoding probability detection means in parallel with an instruction decoded in said first instruction decoder;

said instruction supplying means for selectively validating the parallel-decodable instruction detected by the parallel decoding probability detection means as a validated parallel-decodable instruction in accordance with the signal indicative of the boundary of the first instruction outputted by the first instruction decoder means, and for supplying the validated parallel-decodable instruction to the second instruction decoder means and an instruction subsequent to the validated parallel-decodable instruction to the first instruction decoder means;

reading means for receiving an instruction from said second instruction decoder means when said parallel-decodable instruction is a data transmission instruction and for reading data from the memory unit according to the data transmission instruction;

operating means for performing an operation to be completed by using a plurality of registers according to the subsequent instructions;

delay control means for delay operation of the operating means until necessary data for the operation are obtained in response to instructions decoded by the first instruction decoder means and the second instruction decoder means; and writing means for writing data into the memory unit according to the data transmission instruction.

* * * * *